US008479103B2

(12) United States Patent
DeLuca et al.

(10) Patent No.: US 8,479,103 B2
(45) Date of Patent: Jul. 2, 2013

(54) VISUALIZATION OF REAL-TIME SOCIAL DATA INFORMATICS

(75) Inventors: Lisa Seacat DeLuca, San Francisco, CA (US); Lydia Mai Do, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 12/559,605

(22) Filed: Sep. 15, 2009

(65) Prior Publication Data

US 2011/0066949 A1    Mar. 17, 2011

(51) Int. Cl.
- G06F 3/00 (2006.01)
- G06F 17/00 (2006.01)
- G06F 15/16 (2006.01)

(52) U.S. Cl.
USPC ........... 715/744; 709/204; 709/205; 709/227; 715/205

(58) Field of Classification Search
USPC .......................................................... 715/744
See application file for complete search history.

(56) References Cited

U.S. PATENT DOCUMENTS

| | | | |
|---|---|---|---|
| 6,639,614 B1 | 10/2003 | Kosslyn et al. | |
| 6,961,910 B2 | 11/2005 | Lee et al. | |
| 7,047,092 B2 | 5/2006 | Wimsatt | |
| 7,263,474 B2 | 8/2007 | Fables et al. | |
| 7,539,697 B1 * | 5/2009 | Akella et al. | 1/1 |
| 8,019,875 B1 * | 9/2011 | Nielsen | 709/227 |
| 2005/0055450 A1 * | 3/2005 | Gang | 709/228 |
| 2006/0136584 A1 * | 6/2006 | Decker et al. | 709/224 |
| 2007/0083810 A1 * | 4/2007 | Scott et al. | 715/525 |
| 2007/0255807 A1 * | 11/2007 | Hayashi et al. | 709/219 |
| 2009/0144369 A1 * | 6/2009 | Brown | 709/205 |
| 2009/0222488 A1 * | 9/2009 | Boerries et al. | 707/104.1 |
| 2009/0282104 A1 * | 11/2009 | O'Sullivan et al. | 709/204 |
| 2010/0330972 A1 * | 12/2010 | Angiolillo | 455/418 |

OTHER PUBLICATIONS

"Steam as an Unofficial Friends List," available at http://forum.skyon.be/viewtopic.php?f=7&t=872, Oct. 23, 2008.*
Sintoris et al., "Delivering Multimedia Content in Enabled Cultural Spaces", Mobimedia '07, Aug. 2007, Greece, pp. 1-4.
Palmisano, "Building a smarter planet", IBM W3 news, pp. 1-3, retrieved Aug. 18, 2009 http://w3.ibm.com/news/w3news/top_stories/2008/11/chq_cfr.html.
Costa et al., "A.M.I.G.O.S.: Knowledge Management and Social Networks", 2008, SIGDOC'08, Sep. 2008, Lisbon Portugal, pp. 235-242.

(Continued)

Primary Examiner — Boris Pesin
Assistant Examiner — Matthew Ell
(74) Attorney, Agent, or Firm — Yee & Associates, P.C.; Catherine Ivers (57) ABSTRACT

Data corresponding to a current activity of a user is formatted for display. A contact list, tags of interest, and visual display mapping preferences associated with the user are received. A real time broadcast of a current activity of the user is received. A tag of interest most relevant to the current activity of the user is selected. Real time broadcasts of current activities of contacts associated with the user are received. Tags of interest most relevant to the current activities of the contacts are selected. The tag of interest selected most relevant to the current activity of the user is compared with the tags of interest selected most relevant to the current activities of the contacts. Data corresponding to the current activity of the user and the current activities of the contacts is transmitted in a format determined by the visual display mapping preferences associated with the user.

14 Claims, 8 Drawing Sheets

OTHER PUBLICATIONS

Nardi et al., "Integrating Communication and Information Through Contact Map", Communications of the ACM, Apr. 2002, vol. 45, No. 4, pp. 89-95.

Google search: "contextual visual indication", pp. 1-2, Aug. 18, 2009.

* cited by examiner

VISUALIZATION OF REAL-TIME SOCIAL DATA INFORMATICS

BACKGROUND

1. Field

The disclosure relates generally to an improved data processing system and more specifically to a computer implemented method, apparatus, and computer usable program code for visually mapping social data in real-time based on a relevance to a user's current activity and a social context.

2. Description of the Related Art

Today, most computers are connected to some type of network. A network allows a computer to share information with other computer systems. The Internet is one example of a worldwide computer network. There is no doubt that the Internet has changed the way people communicate.

In addition, today's worldwide computer networks make vast amounts of information increasingly available to users. However, just being connected to these worldwide computer networks is not enough for today's users. Users want to feel a sense of community or want to be socially connected to other users that share common interests.

Thus, a proliferation of social technologies, such as social software, has emerged. Social software encompasses a range of software systems that allow a community of users to interact and share data. This computer-mediated communication has become very popular with social sites like MySpace™ and Facebook®, media sites like Flickr® and YouTube™, as well as commercial sites like Amazon.com® and eBay®.

Social networks allow people to come together online. A social network is a community of users, which are connected by a common interest. In other words, a social network is a social structure made of individuals, which are tied or connected by one or more specific types of interdependency, such as a hobby, work, or relationship, such as a friend or family member.

SUMMARY

According to one embodiment of the present invention, data corresponding to a current activity of a user on a network is formatted for display. A contact list, tags of interest, and visual display mapping preferences associated with a user are received. A real time broadcast of a current activity of the user on the network is also received. A tag of interest associated with the user that is most relevant to the current activity of the user is selected. Real time broadcasts of current activities on the network of contacts listed in the contact list associated with the user are also received. Tags of interest associated with each of the contacts in the contact list that are most relevant to the current activities of each of the contacts are selected. The tag of interest selected most relevant to the current activity of the user is compared with the tags of interest selected most relevant to the current activities of the contacts. Then, data corresponding to the current activity of the user and the current activities of each of the contacts having a matching tag of interest with the tag of interest selected most relevant to the current activity of the user is transmitted in a format determined by the visual display mapping preferences associated with the user to a client device via the network.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
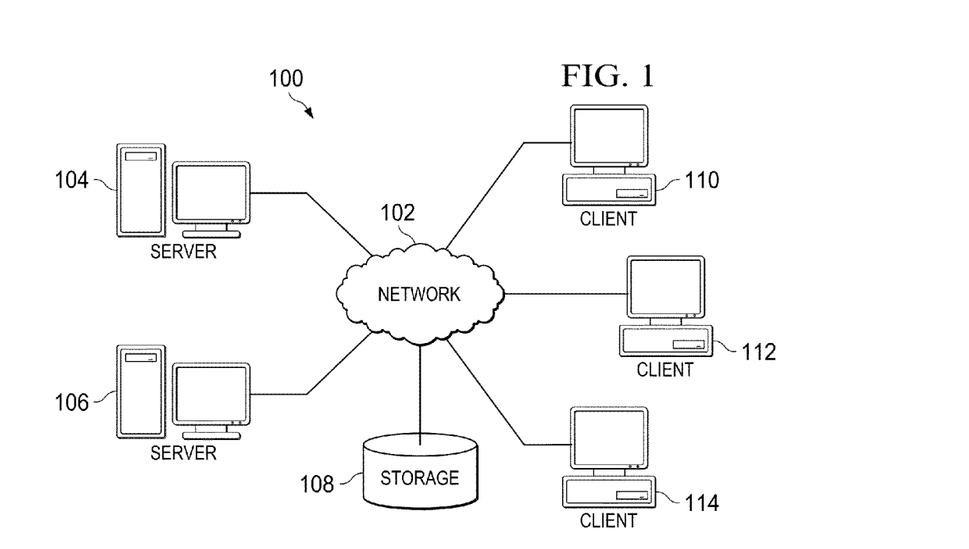
FIG. 1 is a pictorial representation of a network of data processing systems in which illustrative embodiments may be implemented.
Figure 2:
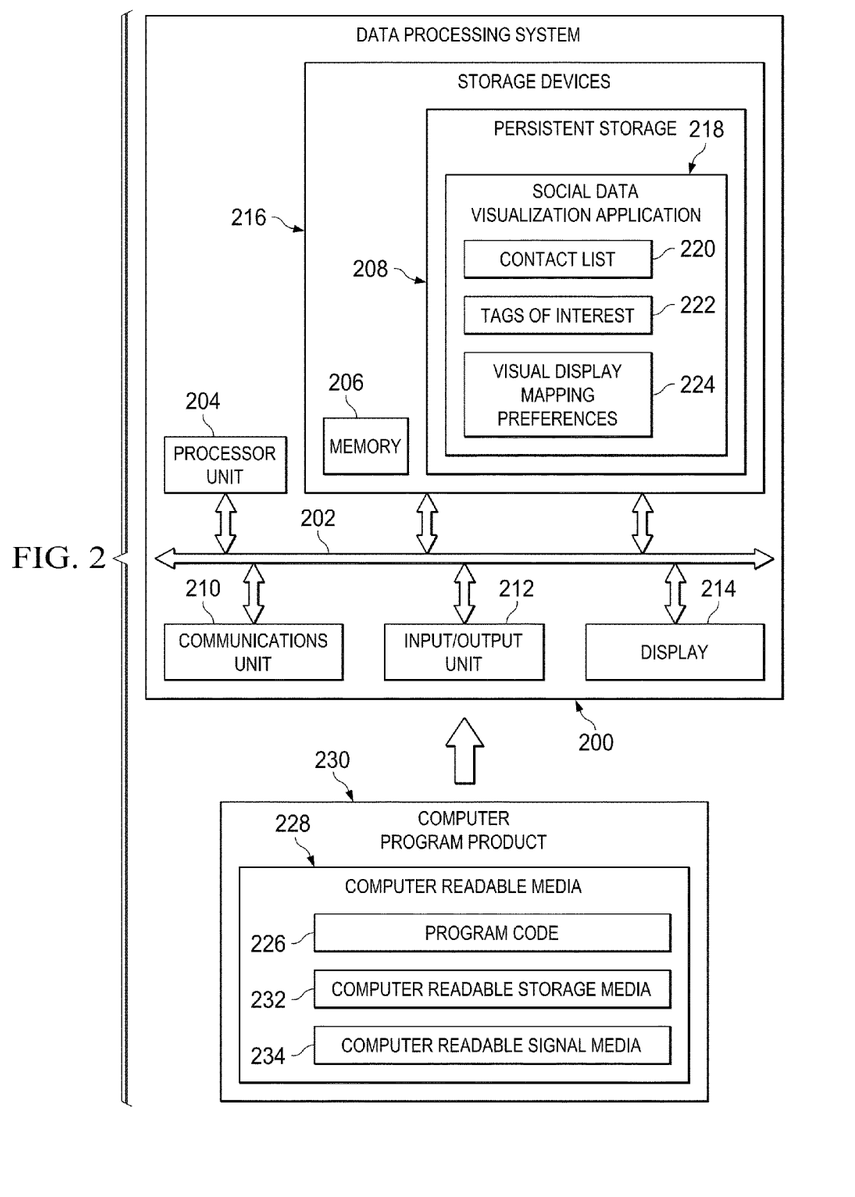
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and other various devices connected together within network data processing system 100. Network 102 may include connections, such as wire, wireless communication links, or fiber optic cables.

In the depicted example, server 104 and server 106 connect to network 102, along with storage unit 108. Storage unit 108 is a network storage device capable of storing data in a structured or unstructured format. Further, storage unit 108 may represent a plurality of storage units connected to network 102.

Storage unit 108 may, for example, store data, such as user identification data, user log in data, and user profile data for a plurality of users. User identification data may include name, identification number, and/or biometric data for a user. User log in data may include a unique user name and password for a user. User profile data may include any data associated with a user, such as employer, job title, address, telephone number, etc. and may also include a picture of the user. Further, storage unit 108 may store one or more contact lists created by each of the users. Furthermore, storage unit 108 may store tags of interest and visual display mapping preferences defined by each of the users. A tag of interest, which may be a name of a topic or may be one or more keywords, corresponds to information found on a network that is of interest to the user that defines the tag. A visual display mapping preference determines how the information found on the network, which corresponds to a particular tag of interest, is displayed to the user within a display device.

Moreover, clients 110, 112, and 114 connect to network 102. Clients 110, 112, and 114 may, for example, be personal computers or network computers. In the depicted example, server 104 provides information, such as boot files, operating system images, and applications to clients 110, 112, and 114. Clients 110, 112, and 114 are clients to server 104 and server 106 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a transient basis and/or a persistent basis. Memory 206, in these examples, may, for example, be a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Persistent storage 208 includes social data visualization application 218. Social data visualization application 218 is a computer program, which includes a plurality of components, that automatically processes, manages, and retrieves information obtained from a user's social network. A user's social network is a social community of users that typically share common interests with the user and are coupled together by a network, such as network 102 in FIG. 1. The user's social network may, for example, include all users connected to the network or only include a predefined subset of users connected to the network, such as members of a particular work group that the user is assigned to.

Alternatively, the user's social network may be defined by a contact list, such as contact list 220, which the user creates. Contact list 220, also known as a buddy list, is a list of contacts or other users connected to the network that the user desires to communicate with. Further, contact list 220 may also include other data associated with each of the contacts, such as how each contact is associated with the user, their respective nicknames, online names, and the like, as well as pictures or other images representing each of the contacts. Furthermore, contact list 220 may be divided into a plurality of subsets. For example, one subset of contacts within the contact list may only include family members, another friends, and yet another co-workers. Also, it should be noted that contact list 220 represents a plurality of contact lists created by each of the other users connected to the network.

Persistent storage 208 also includes tags of interest 222 and visual display mapping preferences 224, which the user defines. Tags of interest 222 are topic tags or keywords, which identify information on the network that is of interest to the user. Visual display mapping preferences 224 are a set of rules that determine how the information identified on the network by particular tags of interest is displayed to the user. In addition, it should be noted that tags of interest 222 and visual display mapping preferences 224 represent a plurality of tags of interest and visual display mapping preferences defined by each of the other users connected to the network.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 226 is located in a functional form on computer readable media 228 that is selectively removable and may be loaded onto or transferred to data processing system 200 for running by processor unit 204. Program code 226 and computer readable media 228 form computer program product 230. In one example, computer readable media 228 may be computer readable storage media 232 or computer readable signal media 234. Computer readable storage media 232 may include, for example, an optical or magnetic disc that is inserted or placed into a drive or other device that is part of persistent storage 208 for transfer onto a storage device, such as a hard drive, that is part of persistent storage 208. Computer readable storage media 232 also may take the form of a persistent storage, such as a hard drive, a thumb drive, or a flash memory that is connected to data processing system 200. In some instances, computer readable storage media 232 may not be removable from data processing system 200.

Alternatively, program code 226 may be transferred to data processing system 200 using computer readable signal media 234. Computer readable signal media 234 may be, for example, a propagated data signal containing program code 226. For example, computer readable signal media 234 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 226 may be downloaded over a network to persistent storage 208 from another device or data processing system through computer readable signal media 234 for use within data processing system 200. For instance, program code stored in a computer readable storage media in a server data processing system may be downloaded over a network from the server to data processing system 200. The data processing system providing program code 226 may be a server computer, a client computer, or some other device capable of storing and transmitting program code 226.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 228 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide a computer implemented method, apparatus, and computer usable program code for visually mapping data based on a relevance to a user's current activity on a network and a social context. The relevance to the user's current activity on the network may be determined by tags of interest that are defined by the user. However, it should be noted that the tags of interest may be defined by other entities, such as, for example, the provider of the content or data. The tags of interest correspond to information that is found on the network, such as Websites, Web pages, documents, pictures, videos, or any other data that may be found on a network. The network may, for example, be the Internet. The social context is determined by the relationship between the user and contacts listed in the user's contact list that are currently performing the same network activity or task as the user.

The user may define which tags of interest the user would like to use and then may define which color or shape, for example, the user wants to associate with a particular tag of interest as a visual display mapping preference. Illustrative embodiments update the display of information based on the current online activity of the user and the current online activities of contacts performing the same activity as the user based on the visual display mapping preferences of the user. As a result, illustrative embodiments are able to present data of common interest between the user and contacts in the user's social network according to the user's current needs.

Thus, illustrative embodiments combine user interest profile databases and user display preference databases to provide a social network experience of common interest and diverse display. In addition, illustrative embodiments enhance integrated communication services and support the entire end-user experience and environment. Further, illustrative embodiments provide a model that builds intelligence into how users can now relate to information.

Figure 3:
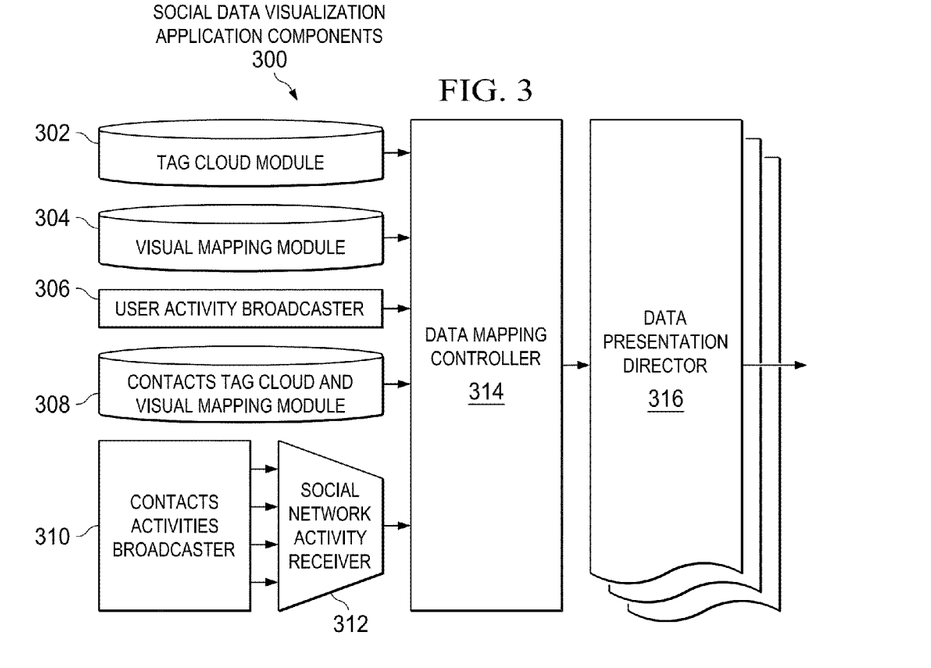
FIG. 3 is an exemplary illustration of components of a social data visualization application in accordance with an illustrative embodiment.

With reference now to FIG. 3, an exemplary illustration of components of a social data visualization application is depicted in accordance with an illustrative embodiment. Social data visualization application components 300 are the software components that comprise a social data visualization application, such as social data visualization application 218 in FIG. 2. Social data visualization application components 300 include tag cloud module 302, visual mapping module 304, user activity broadcaster 306, contacts tag cloud and visual mapping module 308, contacts activities broadcaster 310, social network activity receiver 312, data mapping controller 314, and data presentation director 316.

Social data visualization application components 300 may be implemented in a plurality of devices located in a network of data processing systems, such as network data processing system 100 in FIG. 1. For example, tag cloud module 302, visual mapping module 304, and user activity broadcaster 306 may be implemented in a client device, such as client 110 in FIG. 1. Contacts tag cloud and visual mapping module 308 and contacts activities broadcaster 310 may be implemented in each of a plurality of other client devices, such as clients 112-114 in FIG. 1. Social network activity receiver 312, data mapping controller 314, and data presentation director 316 may be implemented in a server device, such as server 104 in FIG. 1.

Tag cloud module 302 includes tags of interest, such as tags of interest 222 in FIG. 2, which are defined by the user and identify the types of information the user is interested in on the network. Visual mapping module 304 includes visual display mapping preferences, such as visual display mapping preferences 224 in FIG. 2, which are defined by the user and determine how the user prefers to see the information associated with the tags of interest displayed within a display device, such as display 214 in FIG. 2. In addition, visual mapping module 304 analyzes properties of the display device, such as screen size, screen resolution, etc., to determine how the information associated with the tags of interest will be displayed within the display device based on the visual display mapping preferences.

User activity broadcaster 306 broadcasts in real time the current activity of the user on the network for determining what information or topic the user is currently looking at or working on. Contacts tag cloud and visual mapping module 308 includes the tags of interest and the visual display mapping preferences defined by each of a plurality of contacts listed in a contact list, such as contact list 220 in FIG. 2, which is created by and associated with the user. Contacts activities broadcaster 310 broadcasts in real time the current network activities of each of the contacts listed in the user's contact list for determining what information or topics each of the contacts are currently looking at or working on. Social network activity receiver 312 receives the real time broadcasts of the current activities of all the contacts listed in the user's contact list that are connected to the network.

Data mapping controller 314 receives data from tag cloud module 302, visual mapping module 304, user activity broadcaster 306, contacts tag cloud and visual mapping module 308, and social network activity receiver 312. Then, data mapping controller 314 analyzes this received data to determine how to format information found on the network to be of common interest between the user and any of the contacts listed in the contact list. Data mapping controller 314 formats this information of common interest in accordance with visual display mapping preferences defined by the user and the user's contacts listed in the contact list. The visual display mapping preferences correspond to the different tags of interest, which are associated with the current online activities of the user and the user's contacts.

In addition, data mapping controller 314 determines whether any of the contacts' tags of interest associated with each of the contacts' current online activities match the user's tag of interest associated with the user's current online activity. Further, data mapping controller 314 calculates a priority score for each of the contacts that have a matching tag of interest with the user's tag of interest. For example, the user's current activity on the network is viewing work related information. Two contacts in the user's contact list are viewing the same or similar relevant information, which have matching tags of interest with the user's tag of interest. However, one of the contacts is listed in a family subset of the contact list and the other is listed in a co-worker subset of the contact list. Consequently, data mapping controller 314 calculates a higher priority score for the contact listed in the co-worker subset and a lower priority score for the contact listed in the family subset.

As a modification of the example above, both contacts having matching tags of interest with the user's tag of interest are listed in the co-worker subset. However, even though both are listed as co-workers, data mapping controller obtains additional profile information about one of the contacts, which identifies that contact as being a member of the user's current work group. As a result, data mapping controller 314 calculates a higher priority score for the contact in the user's current workgroup and a lower priority score for the contact that is only listed in the user's co-worker subset.

Then, data mapping controller 314 sends this information of common interest, which is formatted according to the visual display mapping preferences defined by the user and the contacts with matching tags of interest, to data presentation director 316. Data presentation director 316 transmits this formatted information of common interest to the user and each of the contacts having matching tags of interest. However, it should be noted that data presentation director 316 may filter the transmission of this formatted information by utilizing a predetermined priority score threshold, which is set by the user.

For example, if a calculated priority score of a contact with a matching tag of interest is not greater than or equal to the predetermined priority score threshold, then data presentation director 316 does not transmit the formatted information to that contact. Using the example above, assume that the calculated priority score for the family member contact with a matching tag of interest regarding the current work related activity of the user is less than the priority threshold, thus data presentation director 316 does not transmit the formatted information to the family member. However, data presentation director 316 does transmit the formatted information to the user and the co-worker contact performing the same work related activity.

With reference now to FIGS. 4-7, different exemplary illustrations are depicted of how a data presentation director, such as data presentation director 316 in FIG. 3, outputs information of common interest in accordance with illustrative embodiments. In the different exemplary illustrations, two users (i.e., user 1 and user 2) have different visual display mapping preferences that coordinate to information on the network that they are interested in. For example, user 1 relates to information via a color, such as purple, whereas user 2 relates to this information via a shape, such as a cross. However, it should be noted that users 1 and 2 may utilize any color, shape, symbol, image, or alphanumeric character to visually identify information of common interest within a display. In addition, user 1 may list user 2 in user 1's contact list along with a plurality of other contacts and user 2 may list user 1 in user 2's contact list along with a plurality of other contacts. The contact lists associated with users 1 and 2 may be used to define the social network for user 1 and user 2, respectively.

Figure 4:
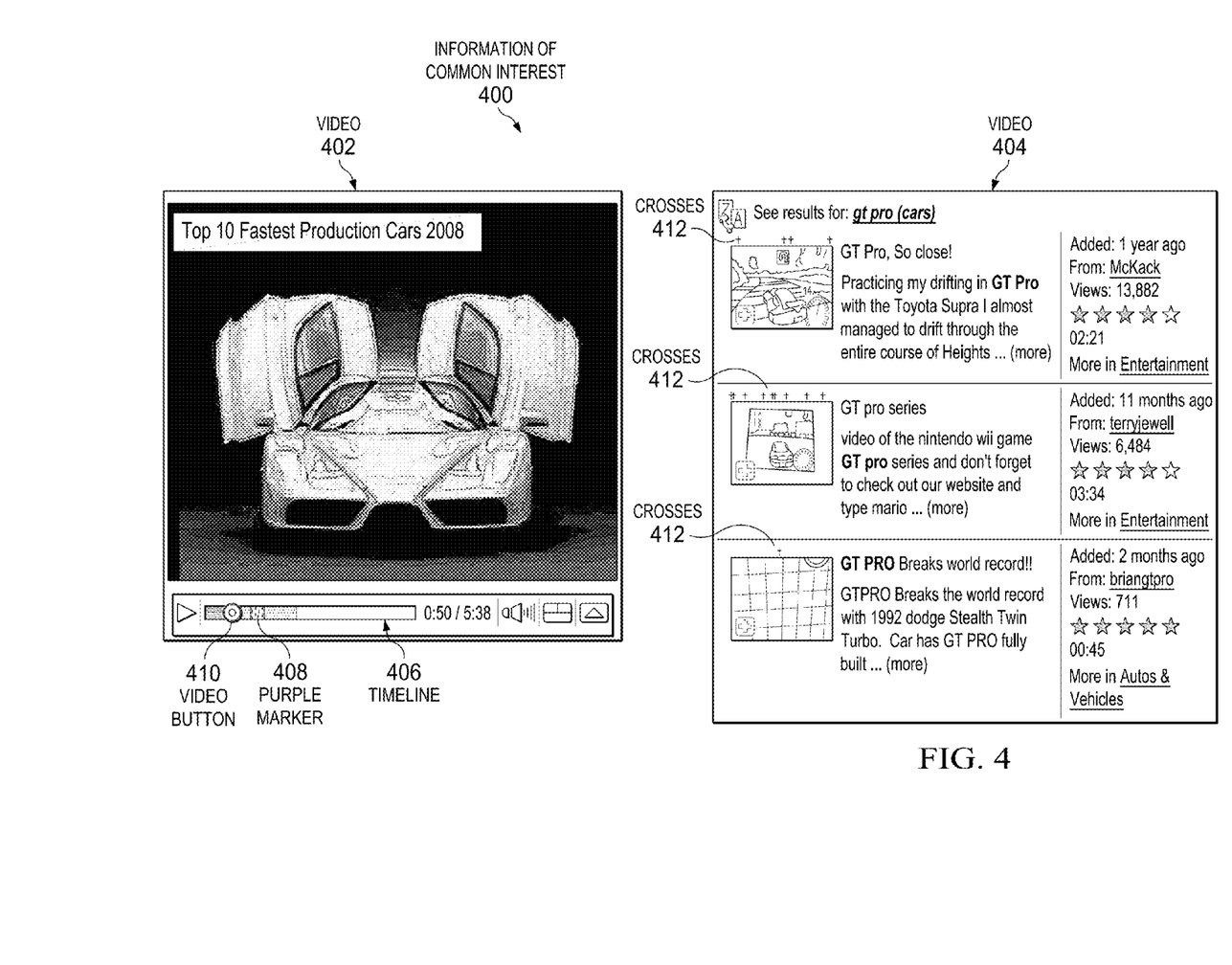
FIG. 4 is one exemplary illustration of how the data presentation director outputs information of common interest in accordance with an illustrative embodiment.

FIG. 4 depicts one exemplary illustration of how the data presentation director outputs information of common interest is depicted in accordance with an illustrative embodiment. Information of common interest 400 is information found on a network, such as network 102 in FIG. 1, which is of common interest to user 1 and user 2. Further, information of common interest 400 is associated with tags of interest defined by users 1 and 2.

Information of common interest 400 includes video 402 and video 404. Video 402 is the current activity of user 1 on the network. In other words, video 402 is the information user 1 is currently looking at on the network. Video 402 also is a video that contains information related to a tag of interest defined by user 1. In other words, user 1 wants to know when contacts listed within user 1's contact list are simultaneously performing the same activity on the network (i.e., looking at the same or similarly relevant information tagged by the same topic of interest or keyword).

In this exemplary illustration, the tag of interest is the topic or keyword "car." As noted above, user 1 desires to relate to information of common interest via the color purple. As a result, the data presentation director visually identifies that portion of video 402 showing the most relevant information featuring an image of a car by inserting purple marker 408 within timeline 406 of video 402. Thus, the data presentation director formats the information of common interest found on the network based on the visual display mapping preference of a purple colored marker for the corresponding tag of interest "car" defined by user 1. User 1 may move video button 410 over purple marker 408 to view that portion of video 402 that is associated with the tagged "car" content.

Video 404 is the current activity of user 2 on the network. In other words, video 404 is the information user 2 is currently looking at on the network. Video 404 is a composite of three video segments and contains information related to a tag of interest defined by user 2.

The tag of interest defined by user 2 also is the topic or keyword "car." As noted above, user 2 desires to relate to information of common interest via the cross shape. As a result, the data presentation director visually identifies those portions of video 404 showing segments containing the tagged "car" content by inserting crosses 412 above the segments. Thus, the data presentation director formats the information of common interest found on the network based on the visual display mapping preference of a cross shape corresponding to the tag of interest "car" defined by user 2. User 2 may view a preview of the car image at a particular time within one of the video segments by, for example, hovering a cursor over a particular cross shape using a mouse.

Figure 5:
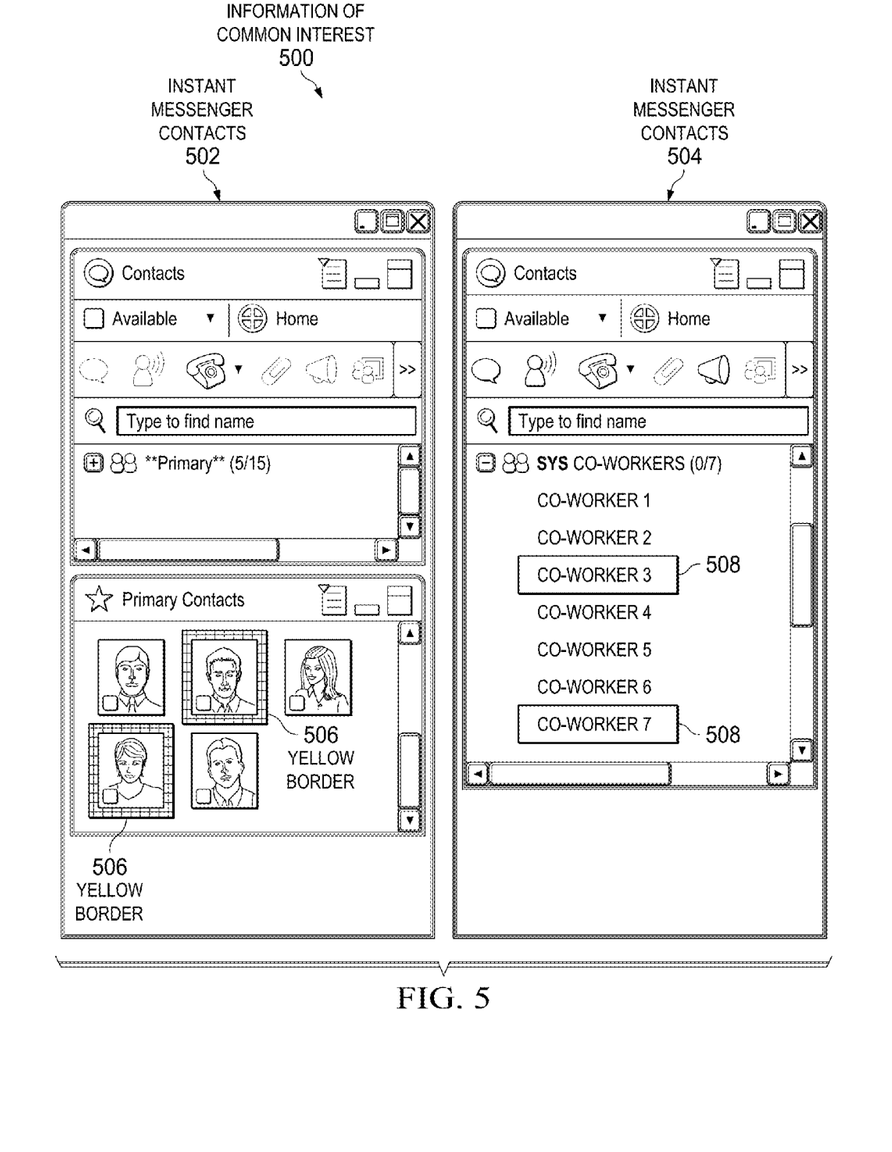
FIG. 5 is another exemplary illustration of how the data presentation director outputs information of common interest in accordance with an illustrative embodiment.

FIG. 5 depicts another exemplary illustration of how the data presentation director outputs information of common interest in accordance with an illustrative embodiment. Information of common interest 500 also is information found on the network that is of common interest to user 1 and user 2. Moreover, information of common interest 500 is associated with the tag of interest "flower," defined by users 1 and 2.

Information of common interest 500 includes instant messaging (IM) contacts 502 and IM contacts 504. IM contacts 502 are contacts that are currently online and are listed within a primary contact subset of a contact list created by user 1. In this exemplary illustration, IM contacts that are currently discussing "flowers" are highlighted by yellow border 506 in user 1's primary contacts window. As a result, the data presentation director allows user 1 to be aware almost immediately that two contacts in user 1's social network are also currently interested in the same topic "flower."

IM contacts 504 are contacts that are currently online and are listed within a co-worker contact subset of a contact list created by user 2. IM contacts that are currently discussing "flowers" are highlighted by rectangular shape 508 in user 2's co-worker contacts window. Consequently, the data presentation director allows user 2 to be aware almost immediately that two contacts within user 2's social network are also currently interested in the same topic "flower."

Figure 6:
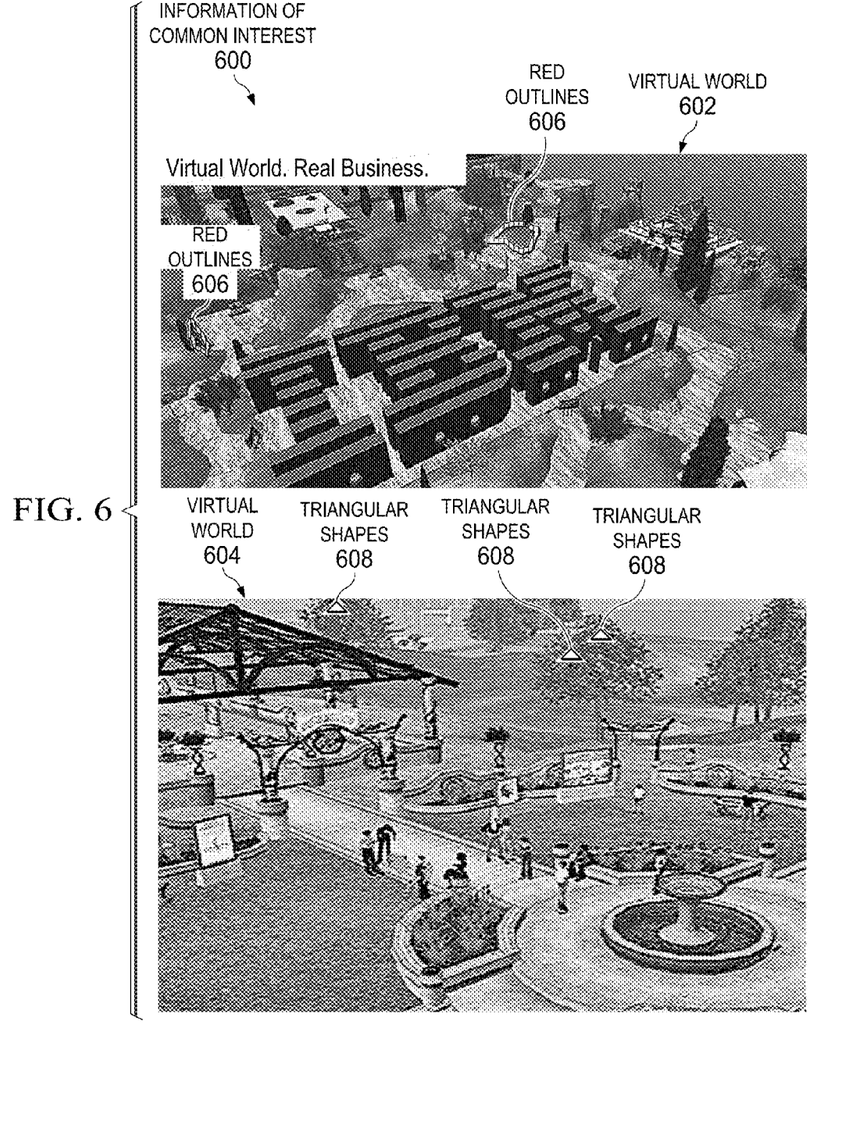
FIG. 6 is a further exemplary illustration of how the data presentation director outputs information of common interest in accordance with an illustrative embodiment.

FIG. 6 depicts a further exemplary illustration of how the data presentation director outputs information of common interest in accordance with an illustrative embodiment. Information of common interest 600 also is information found on the network that is of common interest to user 1 and user 2. Furthermore, information of common interest 600 is associated with the tag of interest "animal," defined by users 1 and 2.

Information of common interest 600 includes virtual world 602 and virtual world 604. Virtual world 602 is a virtual world environment that user 1 is currently looking at on the network. In addition, virtual world 602 also contains information corresponding to the tag of interest "animal" defined by user 1.

As a result, the data presentation director visually identifies those areas within virtual world 602 that show the most relevant information featuring images of animals by inserting red outlines 606 within virtual world 602. In other words, red outlines 606 indicate to user 1 those areas in virtual world 602 that are currently being occupied by animals. Thus, the data presentation director formats the information of common interest found on the network based on the visual display mapping preference of a red colored border for the corresponding tag of interest "animal" defined by user 1. User 1 may, for example, employ a mouse click over areas encompassed by red outlines 606 to view images associated with the tagged "animal" content.

Virtual world 604 is the virtual world environment that user 2 is currently looking at on the network. In addition, virtual world 604 also contains information corresponding to the tag of interest "animal" defined by user 2. As a result, the data presentation director visually identifies those areas within virtual world 604 that show the most relevant information featuring images of animals by inserting triangular shapes 608 within virtual world 604. In other words, trees within the environment of virtual world 604 contain triangles, which denote signs of animal occupation to user 2. Thus, the data presentation director formats the information of common interest found on the network based on the visual display mapping preference of a triangular shape for the corresponding tag of interest "animal" defined by user 2. User 2 may, for example, employ a mouse click over triangular shapes 608 to view images associated with the tagged "animal" content.

Figure 7:
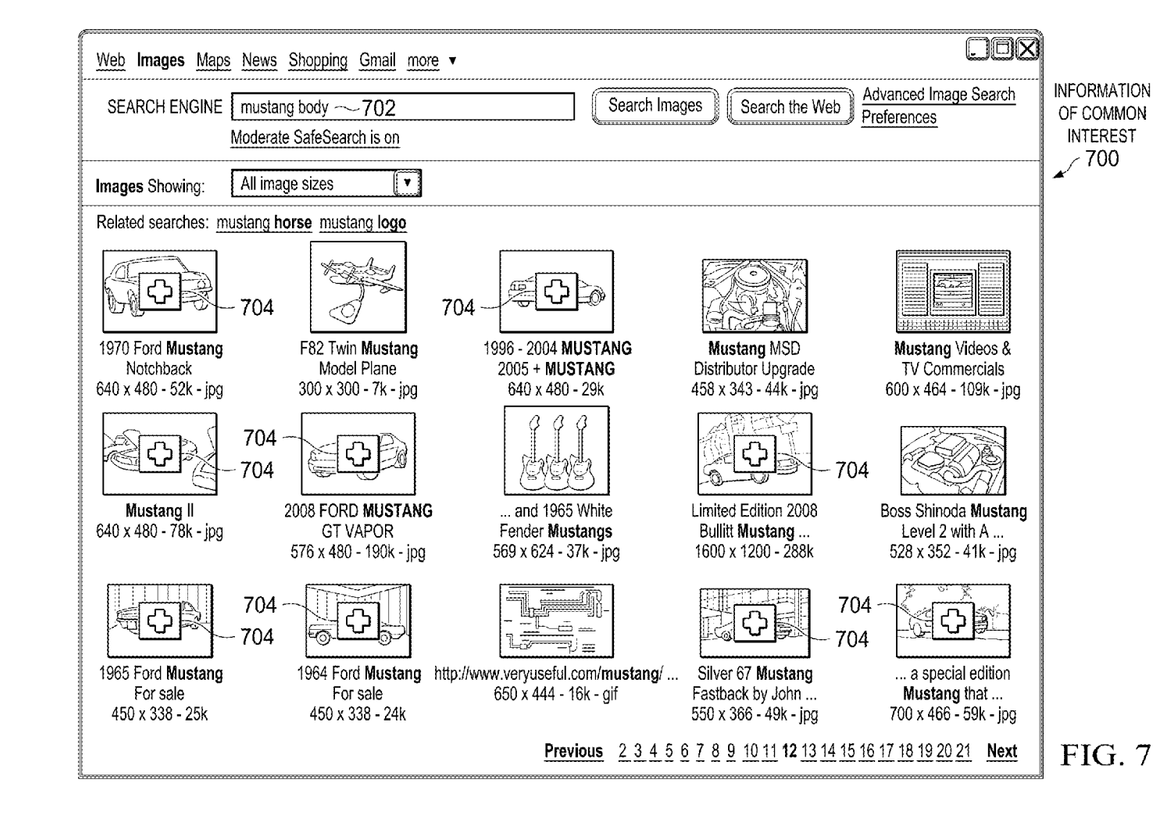
FIG. 7 is a further exemplary illustration of how the data presentation director outputs information of common interest in accordance with an illustrative embodiment.

FIG. 7 depicts a further exemplary illustration of how the data presentation director outputs information of common interest in accordance with an illustrative embodiment. Information of common interest 700 also is information found on the network that is of common interest to user 1 and user 2. Furthermore, information of common interest 700 is associated with the tag of interest "mustang body," defined by users 1 and 2.

Information of common interest 700 includes a screen shot of a plurality of images that correspond to input search term mustang body 702. In this exemplary illustration, the data presentation director allows for visualization of cross-collaboration of real time information being browsed by both user 1 and user 2. When users 1 and 2, which happen to be in the same social network, are viewing data content of shared interest, the data presentation director identifies search items as a combination of their visual display mapping preferences (i.e., a combination of the color purple and the cross shape). For example, the data presentation director reveals the identified search items to both user 1 and user 2 as purple crosses, such as purple crosses 704. This means that a data mapping controller, such as data mapping controller 314 in FIG. 3, resolves the current online activity of the user with the current online activities of contacts listed in the user's contact list.

Then, the data mapping controller sends this resolved information to the data presentation director as a merged visual display mapping for presentation to the user. Purple crosses 704 visually illustrate search items returned by the search engine that correspond to the tag of interest "mustang body," defined by users 1 and 2. Thus, purple crosses 704 visually illustrate a combination of search items that both user 1 and user 2 are currently looking at on the network in real time and have a common interest in.

However, it should be noted that the data presentation director may present data to the user in other formats. For example, the data presentation director may select relevant search items, such as cars, to be highlighted by the color purple and non-relevant search items, such as planes, to be overlaid or totally covered with the color purple to prevent the user's attention from being diverted from the relevant information. In addition, the data presentation director may also hide search items using a particular color or shape until the user scrolls over a particular search item for faster navigation.

Figure 8:
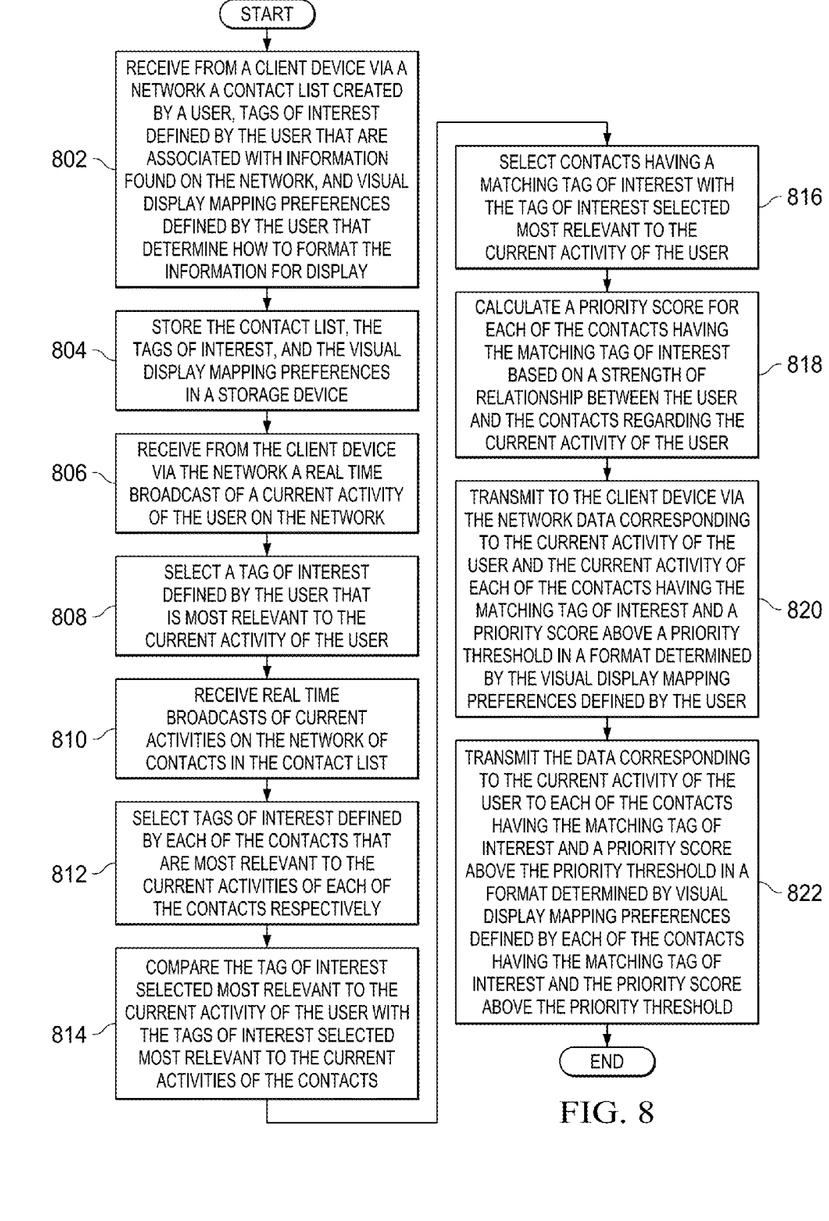
FIG. 8 is a flowchart illustrating an exemplary process for formatting a display of data corresponding to a current activity of a user on a network in accordance with an illustrative embodiment.

With reference now to FIG. 8, a flowchart illustrating an exemplary process for formatting a display of data corresponding to a current activity of a user on a network is shown in accordance with an illustrative embodiment. The process shown in FIG. 8 may be implemented in a server device, such as server 104 in FIG. 1. In addition, the process shown in FIG. 8 may be implemented in components of a social data visualization application, such as social data visualization application components 300 in FIG. 3.

The process begins when the server device uses a data mapping controller, such as data mapping controller 314 in FIG. 3, to receive from a client device via a network a contact list created by a user, tags of interest defined by the user that are associated with information found on the network, and visual display mapping preferences defined by the user that determine how to format the information for display (step 802). The client device and network may, for example, be client 110 and network 102 in FIG. 1. In addition, the contact list, the tags of interest, and the visual display mapping preferences may, for example, be contact list 220, tags of interest 222, and visual display mapping preferences 224 in FIG. 2.

Afterward, the data mapping controller stores the contact list, the tags of interest, and the visual display mapping preferences in a storage device, such as storage 108 in FIG. 1 or persistent storage 208 in FIG. 2 (step 804). Then, the data mapping controller receives from the client device via the network a real time broadcast of a current activity of the user on the network (step 806). Subsequently, the data mapping controller selects a tag of interest defined by the user that is most relevant to the current activity of the user (step 808).

In addition, the data mapping controller uses a social network activity receiver, such as social network activity receiver 312 in FIG. 3, to receive real time broadcasts of the current activities on the network of contacts in the user's contact list (step 810). Further, the data mapping controller selects tags of interest defined by each of the contacts in the contact list that are most relevant to the current activities of each of the contacts respectively (step 812). Then, the data mapping controller compares the tag of interest selected most relevant to the current activity of the user with the tags of interest selected most relevant to the current activities of the contacts (step 814).

Afterward, the data mapping controller selects contacts that have a matching tag of interest with the tag of interest selected most relevant to the current activity of the user (step 816). Subsequently, the data mapping controller calculates a priority score for each of the contacts having the matching tag of interest based on a strength of relationship between the user and the contacts regarding the current activity of the user (step 818). Then, the data mapping controller uses a data presentation director, such as data presentation director 316 in FIG. 3, to transmit to the client device via the network data corresponding to the current activity of the user and the current activity of each of the contacts having the matching tag of interest and a priority score above a priority threshold in a format determined by the visual display mapping preferences defined by the user (step 820). In addition, the data presentation director also transmits the data corresponding to the current activity of the user to each of the contacts having the matching tag of interest and a priority score above the priority threshold in a format determined by visual display mapping preferences defined by each of the contacts having the matching tag of interest and the priority score above the priority threshold (step 822). The process terminates thereafter.

Figure 9:
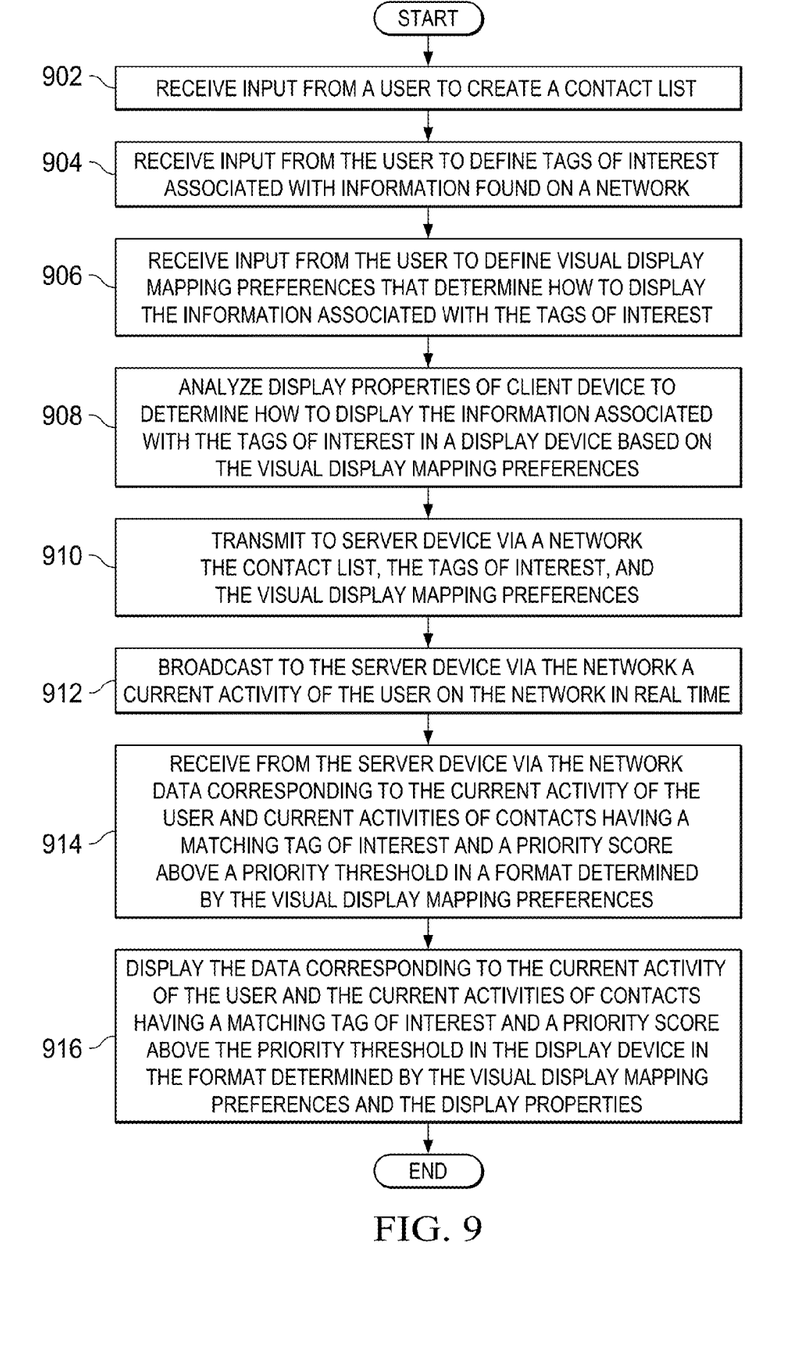
FIG. 9 is a flowchart illustrating an exemplary process for displaying data corresponding to a current activity of a user on a network in accordance with an illustrative embodiment.

With reference now to FIG. 9, a flowchart illustrating an exemplary process for displaying data corresponding to a current activity of a user on a network is shown in accordance with an illustrative embodiment. The process shown in FIG. 9 may be implemented in a client device, such as client 110 in FIG. 1. In addition, the process shown in FIG. 9 may be implemented in components of a social data visualization application, such as social data visualization application components 300 in FIG. 3.

The process begins when the client device receives input from a user to create a contact list, such as contact list 220 in FIG. 2 (step 902). The contact list defines the user's social network. In addition, the contact list may be divided into a plurality of subsets, such as, for example, family, friends, classmates, organization members, and co-workers.

Then, the client devices uses a tag cloud module, such as tag cloud module 302 in FIG. 3, to receive input from the user to define tags of interest, such as tags of interest 222 in FIG. 2, which are associated with information found on a network (step 904). Afterward, the client device uses a visual mapping module, such as visual mapping module 304 in FIG. 3, to receive input from the user to define visual display mapping preferences, such as visual display mapping preferences 224 in FIG. 2, which determine how to display the information associated with the tags of interest (step 906). In addition, the visual mapping module analyzes display properties of the client device to determine how to display the information associated with the tags of interest in a display device, such as display 214 in FIG. 2, based on the visual display mapping preferences (step 908).

Subsequently, the client device transmits to a server device via a network the contact list, the tags of interest, and the visual display mapping preferences (step 910). The server device and the network may, for example, be server 104 and network 102 in FIG. 1. Further, the client device uses a user activity broadcaster, such as user activity broadcaster 306 in FIG. 3, to broadcast to the server device via the network a current activity of the user on the network in real time (step 912).

Afterward, the client device receives from the server device via the network data corresponding to the current activity of the user and current activities of contacts having a matching tag of interest and a priority score above a priority threshold in a format defined by the visual display mapping preferences (step 914). Then, the visual mapping module displays the data corresponding to the current activity of the user and the current activities of contacts having a matching tag of interest and a priority score above the priority threshold in the display device in the format defined by the visual display mapping preferences and the display properties (step 916). The process terminates thereafter.

Thus, illustrative embodiments of the present invention provide a computer implemented method, apparatus, and computer program product for visually mapping data based on the relevance to a user's current activity on a network and a social context. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening non-public or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for formatting a display of data corresponding to a current activity of a user on a network, the computer implemented method comprising:
   receiving by a server device a contact list, tags of interest, and visual indicators associated with the user from a client device via the network, wherein the user associates a visual indicator with each of the tags of interest, and wherein the visual indicator is one of a user-defined color or a user-defined shape, and wherein the visual indicator identifies data being browsed by the user and contacts listed in the contact list associated with the user;
   receiving by the server device a real time broadcast of a current activity of the user on the network;
   selecting by the server device a tag of interest associated with the user that is most relevant to the current activity of the user;
   receiving by the server device real time broadcasts of current activities on the network of the contacts listed in the contact list associated with the user;
   selecting by the server device tags of interest associated with each of the contacts in the contact list that are most relevant to the current activities of each of the contacts;
   comparing by the server device the tag of interest selected most relevant to the current activity of the user with the tags of interest selected most relevant to the current activities of the contacts;
   selecting by the server device contacts having a matching tag of interest with the tag of interest selected most relevant to the current activity of the user;
   calculating by the server device a priority score for each of the contacts having the matching tag of interest based on a strength of relationship between the user and the contacts regarding the current activity of the user; and
   transmitting by the server device the data corresponding to the current activity of the user to each of the contacts having the matching tag of interest and a priority score above a priority threshold, wherein the server device combines the visual indicator associated with the tag of interest selected most relevant to the current activity of the user with different visual indicators associated with the contacts having the matching tag of interest and the priority score above the priority threshold to form a single combined visual indicator providing visualization of cross-collaboration of the data being browsed by the user and each of the contacts having the matching tag of interest and the priority score above the priority threshold.

2. The computer implemented method of claim 1, further comprising:
   transmitting by the server device the data corresponding to the current activity of the user and the current activities of each of the contacts having the matching tag of interest and the priority score above the priority threshold in a format determined by visual display mapping preferences associated with the user to the client device via the network.

3. The computer implemented method of claim 1, further comprising:
   storing by the server device the contact list, the tags of interest, and the visual indicators in a storage device.

4. The computer implemented method of claim 2, further comprising:
   analyzing display properties of the client device to determine how to display information associated with a tag of interest within a display device based on a visual display mapping preference corresponding to the tag of interest.

5. The computer implemented method of claim 4, further comprising:
   displaying by the client device the data corresponding to the current activity of the user and the current activities of each of the contacts having the matching tag of interest and the priority score above the priority threshold within the display device in the format defined by the visual display mapping preferences associated with the user and the display properties of the client device.

6. The computer implemented method of claim 1, wherein the tags of interest associated with the user are defined by the user and are associated with information found on the network.

7. The computer implemented method of claim 2, wherein the visual display mapping preferences associated with the user are defined by the user and determine how to format the data for display in a display device.

8. The computer implemented method of claim 1, wherein a tag of interest is one of a topic name or one or more keywords.

9. A data processing system for formatting a display of data corresponding to a current activity of a user on a network, comprising:
a bus system;
a storage device connected to the bus system, wherein the storage device stores a set of instructions; and
a processing unit connected to the bus system, wherein the processing unit executes the set of instructions to receive a contact list, tags of interest, and visual indicators associated with the user from a client device via the network, wherein the user associates a visual indicator with each of the tags of interest, and wherein the visual indicator is one of a user-defined color or a user-defined shape, and wherein the visual indicator identifies data being browsed by the user and contacts listed in the contact list associated with the user; receive a real time broadcast of a current activity of the user on the network; select a tag of interest associated with the user that is most relevant to the current activity of the user; receive real time broadcasts of current activities on the network of contacts listed in the contact list associated with the user; select tags of interest associated with each of the contacts in the contact list that are most relevant to the current activities of each of the contacts; compare the tag of interest selected most relevant to the current activity of the user with the tags of interest selected most relevant to the current activities of the contacts; select contacts having a matching tag of interest with the tag of interest selected most relevant to the current activity of the user; calculate a priority score for each of the contacts having the matching tag of interest based on a strength of relationship between the user and the contacts regarding the current activity of the user; and transmit the data corresponding to the current activity of the user to each of the contacts having the matching tag of interest and a priority score above a priority threshold, wherein the processing unit combines the visual indicator associated with the tag of interest selected most relevant to the current activity of the user with different visual indicators associated with the contacts having the matching tag of interest and the priority score above the priority threshold to form a single combined visual indicator providing visualization of cross-collaboration of the data being browsed by the user and each of the contacts having the matching tag of interest and the priority score above the priority threshold.

10. A computer program product stored on a non-transitory computer usable storage medium having computer usable program code embodied thereon that is executable by a computer for formatting a display of data corresponding to a current activity of a user on a network, the computer program product comprising:
computer usable program code for receiving a contact list, tags of interest, and visual indicators associated with the user from a client device via the network, wherein the user associates a visual indicator with each of the tags of interest, and wherein the visual indicator is one of a user-defined color or a user-defined shape, and wherein the visual indicator identifies data being browsed by the user and contacts listed in the contact list associated with the user;
computer usable program code for receiving a real time broadcast of a current activity of the user on the network;
computer usable program code for selecting a tag of interest associated with the user that is most relevant to the current activity of the user;
computer usable program code for receiving real time broadcasts of current activities on the network of contacts listed in the contact list associated with the user;
computer usable program code for selecting tags of interest associated with each of the contacts in the contact list that are most relevant to the current activities of each of the contacts;
computer usable program code for comparing the tag of interest selected most relevant to the current activity of the user with the tags of interest selected most relevant to the current activities of the contacts;
computer usable program code for selecting contacts having a matching tag of interest with the tag of interest selected most relevant to the current activity of the user;
computer usable program code for calculating a priority score for each of the contacts having the matching tag of interest based on a strength of relationship between the user and the contacts regarding the current activity of the user; and
computer usable program code for transmitting the data corresponding to the current activity of the user to each of the contacts having the matching tag of interest and a priority score above a priority threshold, wherein the computer combines the visual indicator associated with the tag of interest selected most relevant to the current activity of the user with different visual indicators associated with the contacts having the matching tag of interest and the priority score above the priority threshold to form a single combined visual indicator providing visualization of cross-collaboration of the data being browsed by the user and each of the contacts having the matching tag of interest and the priority score above the priority threshold.

11. The computer program product of claim 10, further comprising:
computer usable program code for transmitting the data corresponding to the current activity of the user and the current activities of each of the contacts having the matching tag of interest and the priority score above the priority threshold in a format determined by visual display mapping preferences associated with the user to the client device via the network.

12. The computer program product of claim 10, further comprising:
computer usable program code for storing the contact list, the tags of interest, and the visual indicators in a storage device.

13. The computer program product of claim 11, further comprising:
computer usable program code for analyzing display properties of the client device to determine how to display information associated with a tag of interest within a display device based on a visual display mapping preference corresponding to the tag of interest.

14. The computer program product of claim 13, further comprising:

computer usable program code for displaying the data corresponding to the current activity of the user and the current activities of each of the contacts having the matching tag of interest and the priority score above the priority threshold within the display device in the format defined by the visual display mapping preferences associated with the user and the display properties of the client device.

* * * * *